United States Patent
Salamitou et al.

(10) Patent No.: US 6,755,086 B2
(45) Date of Patent: Jun. 29, 2004

(54) FLOW METER FOR MULTI-PHASE MIXTURES

(75) Inventors: Philippe F. Salamitou, Mamaroneck, NY (US); Kenneth E. Stephenson, Newtown, CT (US); John W. J. Ferguson, Cambridge (GB); John Barry Fitzgerald, Cambridge (GB); Anthony Robert Holmes Goodwin, Thomaston, CT (US); Gerald H. Meeten, Ware (GB); Sarah Pelham, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 237 days.

(21) Appl. No.: 10/028,625

(22) Filed: Dec. 20, 2001

(65) Prior Publication Data

US 2002/0139197 A1 Oct. 3, 2002

Related U.S. Application Data

(63) Continuation-in-part of application No. 09/335,069, filed on Jun. 17, 1999, now Pat. No. 6,345,537.

(51) Int. Cl.[7] .................................................. G01F 1/74
(52) U.S. Cl. .................................................... 73/861.04
(58) Field of Search ......................... 73/861.04, 861.02, 73/861.06, 861.12, 861.14, 861.15, 861.63

(56) References Cited

U.S. PATENT DOCUMENTS

| 6,405,604 B1 | * | 6/2002 | Berard et al. | ............ 73/861.63 |
| 6,467,358 B1 | * | 10/2002 | Nishi et al. | .............. 73/861.04 |
| 6,612,187 B1 | * | 9/2003 | Lund | ....................... 73/861.04 |

FOREIGN PATENT DOCUMENTS

GB      2266597 A   * 11/1993      ............. G01F/1/74

* cited by examiner

Primary Examiner—Edward Lefkowitz
Assistant Examiner—Corey Mack
(74) Attorney, Agent, or Firm—Brigitte L. Jeffery; John Ryberg

(57) ABSTRACT

A flow meter for multiphase flows, includes a holdup measuring device having a Venturi located upstream thereof and separated therefrom by a distance that results in flow through the holdup measuring device being at least partially homogenized by the effect of the Venturi on the fluids flowing therethrough.

36 Claims, 5 Drawing Sheets

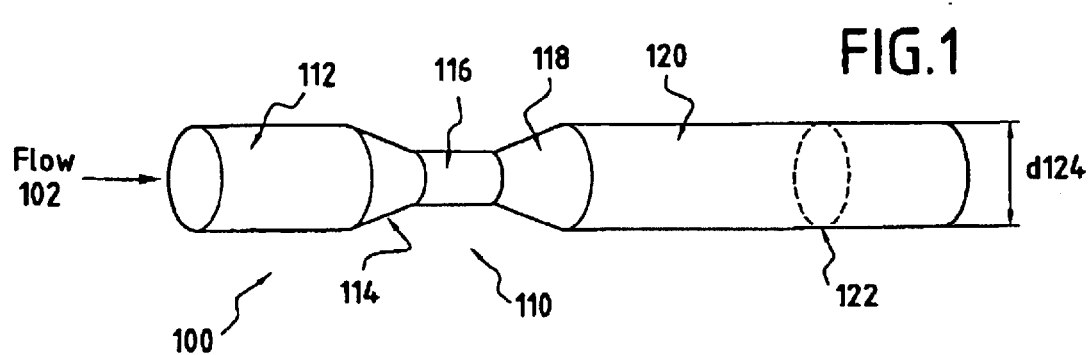
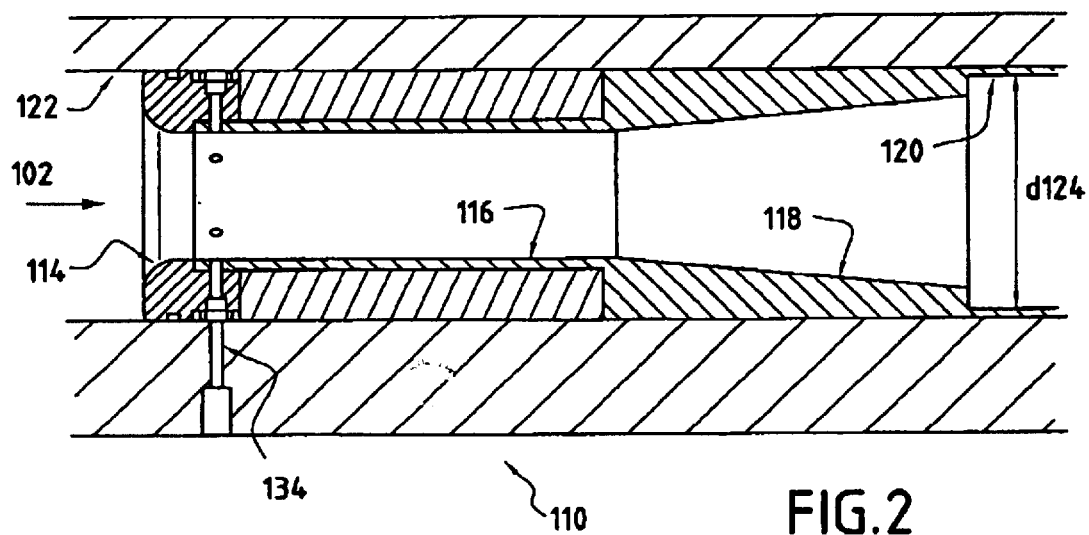
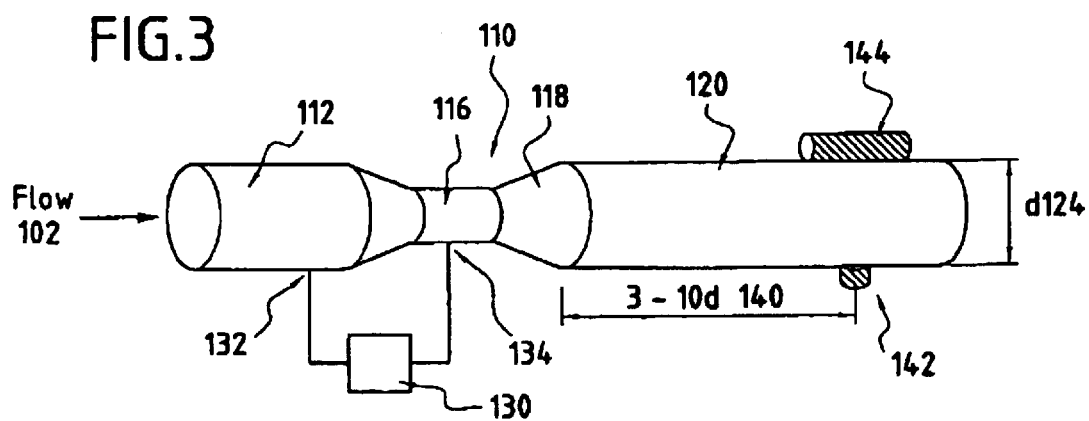

Total volumetric flow rate

- □ 40 m³/h
- △ 60 m³/h
- × 80 m³/h
- + 100 m³/h

Total volumetric flow rate

- □ 40 m³/h
- △ 60 m³/h
- × 80 m³/h
- + 100 m³/h

Total volumetric flow rate

- □ 40 m³/h
- △ 60 m³/h
- × 80 m³/h
- + 100 m³/h

FLOW METER FOR MULTI-PHASE MIXTURES

RELATED APPLICATIONS

The present application is a continuation in part of application Ser. No. 09/335,069 filed Jun. 17, 1999 now U.S. Pat. No. 6,345,537 and is related to pending PCT application number PCT/EP01/02762 and pending PCT application number PCT/GB00/01758 both of which designates, inter alia, the United States and the disclosures of which are incorporated herein by reference.

FIELD OF THE INVENTION

The present invention relates to the field of flow meters for multiphase mixtures. In particular, the invention relates to flow meters for oil and water mixtures in hydrocarbon wells.

BACKGROUND OF THE INVENTION

The measurement of oil and water flow rate in each producing zone of an oil well is important to the monitoring and control of fluid movement in the well and reservoir. In addition to a flow meter, each zone may have a valve to control the fluid inlet from that zone. By monitoring flow rates of oil and water from each zone and reducing flow from those zones producing the highest water cut (i.e., ratio of water flow rate to total flow rate), the water production of the entire well can be controlled. This, in addition, allows the reservoir oil to be swept more completely during the life of the well.

To evaluate the water and hydrocarbon flow rates in homogeneous flows in a well, three quantities must be estimated, namely, the mean water volume fraction $H_w$, the mean water velocity $v_w$, and the mean hydrocarbon velocity $v_o$. The flow rates are then as follows:

$$q_w = A H_w v_w \quad [1]$$

for the water; and $$q_o = A(1-H_w) v_o \quad [2]$$

for the hydrocarbon, where A is the section of the well.

When the flow is not homogeneous, which is possible in deviated wells, flow-rate evaluations based on the above equations are invalid. It is then necessary to take account of the effective distribution of the velocities and of the volume fractions across the section of the well. In order to adopt such an approach, it is necessary that a plurality of devices are placed across a given cross-section of the well.

It is also known that the velocity of a flow in a well can be determined by measuring a magnitude that varies over time $s_1(t)$ and $s_2(t)$ at two different locations in the well separated in the direction of flow, and then by calculating a cross-correlation function:

$$C = <s_1(t)^* s_2(t+T)> \quad [3]$$

In a two-phase fluid, the fluctuations in the magnitude s(t) may, for example, be due to inhomogeneous structures propagating along the pipe at the mean speed of the flow.

If T is the value of t found for which C is a maximum, the speed v of the flow is given by:

$$v = L/T \quad [4]$$

where L is the axial distance between the two measurement sections.

Ideally, a flow meter for making such measurement in a well should satisfy several criteria: 1) it should be extremely reliable and operate for long periods at downhole temperature and pressure; 2) it should operate in both stratified (near-horizontal) and dispersed flow regimes over a wide range of total flow rate and cut; 3) it should not require that the well completion be oriented azimuthally in any particular way during installation; 4) it should not require the use of radioactive sources: and 5) the flow meter should allow small changes in water cut and flow rate to be detected.

Typically, downhole flow meters determine the holdup (volume fraction of oil or water) and the velocity of the oil phase, the water phase, or both. The flow rate of water is then determined from the product of water holdup $\alpha_w$, the pipe area A, and the velocity of water $U_W$. An analogous relation holds for oil flow rate. In general, the velocities of water and oil are different. The slip velocity (difference in oil and water velocities) depends on many parameters, such as the inclination angle of the flow pipe (i.e. deviation), roughness of the pipe wall, and flow rates of the two phases. In general, one must measure the holdup and velocities of both oil and water to determine oil and water flow rate uniquely. In practice, sometimes one measures the velocity of only one phase and uses a theoretical or empirically determined slip law to obtain the other. This has a number drawbacks including inaccuracies due to differences conditions used as inputs to the model and the actual conditions downhole.

A common method to determine the velocity of a fluid is to measure the rotation rate of a spinner in the flow stream. In single phase flow, the rotational velocity of the spinner is simply related to the velocity of the flow. However, in mixed oil and water flow the response of the spinner can be so complicated as to be impossible to interpret.

Another method of velocity measurement uses tracers. A tracer is injected into the phase of choice (oil or water) and, at a known distance downstream, a sensor detects the time of passage of the tracer. The velocity is computed from the known distance and time of travel. One disadvantage of the tracer method for permanent downhole use is the need for a reservoir of tracer material and a mechanical tracer injector. The reservoir limits the number of measurements and the injector, being a mechanical device, is prone to sticking and failure.

Another method of velocity measurement uses a Venturi. In single phase flow, a Venturi generally obeys the Bernoulli equation which relates volumetric flow rate Q to fluid density $\rho$ and pressure drop from the inlet to the throat of the Venturi:

$$Q = C \sqrt{\frac{2\Delta p/\rho}{\left(\frac{1}{A_{throat}^2} - \frac{1}{A_{inlet}^2}\right)}} \quad [5]$$

where C is the discharge coefficient which is approximately unity but depends on the geometry of the Venturi, $\Delta p$ is the pressure drop from Venturi inlet to throat, and $A_{throat}$ and $A_{inlet}$ are the throat and inlet cross sectional areas, respectively. The same equation can be used to determine the combined oil and water flow rate where the density in this case is the average mixture density in the throat of the Venturi. In practice, the square root in the equation makes it relatively insensitive to errors in both the density and pressure determinations.

A common method to determine the holdup in a flow of oil and water is to measure the average density of the fluid. Since oil at downhole pressure and temperature typically has a density which is smaller than that of water (around 0.7 g/cm$^3$ compared to 1.0 g/cm$^3$), the oil and water holdups $\alpha_o$ and $\alpha_w$ can be determined proportionately from the mixture density by the relations $$\alpha_o = \frac{\rho_w - \rho_{mix}}{\rho_w - \rho_o} \quad [6]$$

$$\alpha_w = \frac{\rho_{mix} - \rho_o}{\rho_w - \rho_o} \quad [7]$$

A common method to determine the mixture density is to measure the hydrostatic pressure of a column of fluid with a gradiomanometer. This device relies on having a component of the gravitational force vector along the axis of the flow pipe. This type of device, however, fails when the flow pipe is horizontal because the gravitational force vector is perpendicular to the pipe axis.

It is also known, e.g. from U.S. Pat. No. 5,017,879 or FR 2 780 499, that capacitive devices can be used to determine the characteristics of multi-phase flows. The dielectric constant of a mixture of fluids depends on the respective fraction of each of its components and on their individual dielectric constants. It has thus been proposed to estimate the composition of a two-phase fluid on the basis of its dielectric constant.

The dielectric constant is itself obtained by exciting the fluid by means of electrodes separated by the fluid, in particular electrodes placed on the pipe, and across which an AC voltage is applied. The measured magnitude is the resulting current. Guard electrodes have also been added to maintain the electrostatic field between the active electrodes. It is thus easier to interpret the measurements by limiting the edge effects due to the finite length of the active electrodes, or by focusing the electric field in a particular zone of the flow.

In both of the above-mentioned cases, namely when the flow is not homogeneous, or when the velocity is measured, it is thus necessary to dispose a plurality of devices, in particular capacitive devices, close together on the pipe. Contradictory requirements then have to be faced.

It is desirable to use devices that are of small size. In a non-homogeneous flow, better resolution in space is thus obtained, thereby considerably improving the speed and the accuracy of the interpretation algorithm. When velocity is to be measured, the small size of the devices makes it possible to position them closer together, and thus to obtain a correlation peak that is clearer for the resulting measurements, because the inhomogeneous structures deform to a lesser extent between the two devices. Unfortunately, such a small size generally makes the measurements much more sensitive to electromagnetic noise. When the measurements are capacitive measurements, the measured capacitance values are low. Typically, the currents induced by the stray capacitance may be greater by several orders of magnitude than the current resulting from the capacitance to be measured. The stray capacitance thus gives rise to a systematic error or bias whose variations can exceed the amplitude of the signal itself.

Flow measurement devices are also known that comprise a segment of insulating pipe and means for generating an electric current in the fluid flowing in said pipe. These devices thus complement the preceding devices since they apply to multiphase fluids having a continuous conductive phase, i.e. fluids that are not insulating.

The difficulty with such devices lies in measuring the potential difference between two points of the fluid to deduce the electrical resistance between those two points, given knowledge of the current. Thereafter, the resistance is used to deduce the mean resistivity given that the shape of the pipe is known.

Mixers of various types have been used to mix the oil and water, so as to effectively reduce the slip and allow for more accurate determination of the flow rates. Some mixers are simply small orifices in plates of suitable material. Others comprise more elaborate fins having certain twists or curled shapes. There are a number of disadvantages, however, in using conventional mixers when trying to measure the flow rates of oil and water downhole. For example, the mixer often obstructs the borehole, such that it may be difficult to pass certain equipment such as production logging tools, etc. Mixers also can produce unacceptable amounts of pressure loss. Additionally, mixers are prone to excessive wear with age.

It is possible to measure the pressure differential upstream and downstream of a conventional mixer in an attempt to determine the total flow rate of oil and water. This technique, however, has a number of drawbacks. For example, the accuracy of the flow rate determined by this method is likely to be much lower than using a Venturi, and, in general, greatly dependent upon the flow rates. Using a mixer to measure pressure differential can also lead to inaccuracy due to sensitivity to the exact location of pressure measurement. Using a conventional mixer in this fashion would also be prone to problems associated with wear. For example, in an orifice mixer, the relationship between the pressure differential and the velocity could change significantly over time due to slight changes in shape and size of the orifice caused by wear.

U.S. Pat. No. 4,856,344, issued to Hunt, discloses using a Venturi for obtaining a pressure differential and using a gradiomanometer upstream and through the Venturi to measure density. Hunt discloses using an iterative process to estimate the relative flow velocities. Hunt also discloses using a separate upstream step discontinuity to mix the fluids upstream of the gradiomanometer. However, the method disclosed in Hunt is prone to problems associated with relying on estimates of the flow velocities (i.e. a slip model), using separate additional mixers upstream, and using a gradiomanometer (e.g. nonfunctional when pipe is horizontal, and low accuracy when near-horizontal).

U.S. Pat. No. 5,361,632, issued to Magnani, discusses a holdup measurement using a combination of gradiomanometer and gamma-ray densitometer. Thus, the method of Magnani is prone to problems associated with using a gradiomanometer which is not suitable for measurements in near-horizontal pipes. Furthermore, the method obstructs the borehole and would not be suitable for permanent installation.

U.S. Pat. No. 5,661,237, issued to Dussan et al. discusses a holdup measurement using local probes. There is no mention of a Venturi, however. The method obstructs the borehole and would not be suitable for permanent installation.

U.S. Pat. Nos. 5,893,642 and 5,822,390, issued to Hewitt et al. disclose a method of using a mixer to measure flow rates. However, this method suffers from the disadvantages of using a mixer as described above. For example, the mixer obstructs borehole and is not suitable for permanent installation due to problems of wear.

SUMMARY OF THE INVENTION

The present invention provides a flow meter for multiphase flows, comprising a holdup measuring device having a Venturi located upstream thereof and separated therefrom by a distance that results in flow through the holdup measuring device being at least partially homogenized by the effect of the Venturi on the fluids flowing therethrough.

Preferably, the holdup measuring device is a capacitive device and/or a resistive device. It is particularly preferred that the holdup measuring device measures volume fractions in the range of 0–100% water. Such a device can be provided by a combination of capacitive and resistive measurements on the flowing fluids.

Preferred capacitive sensors for determining the characteristics of multi-phase flows are of small size and substantially insensitive to noise and thus substantially free from systematic error. A particularly preferred sensor comprises at least one excitation electrode provided with at least one cutout in which at least one measurement electrode is disposed, the electrodes being applied against the pipe.

A device for measuring the dielectric constant of a multi-phase fluid flowing along a pipe comprises at least one sensor as described above, means for maintaining the electrodes at the same potential and for measuring the current output by the measurement electrode, and means for deducing the dielectric constant from the current.

This configuration then makes it possible for all of the conductors liable to give rise to interference that are situated in the vicinity of the device in the detection system to be maintained at the potential of the excitation electrode. As the conductors are at the same potential as the measurement electrode, the load thereon thus depends only on the potentials applied to the active electrodes.

In a first embodiment, the excitation electrode is connected to the general ground of power supply means. This approach is relatively simple.

In another embodiment, the excitation electrode constitutes a floating ground for the current measuring means. The advantage of this embodiment is that the signal can be amplified to a level at which it dominates the common mode rejection voltage of the amplifier. In this embodiment, the current measuring may comprise a first amplification stage referenced relative to the potential of the excitation electrode, and a second amplification stage arranged to bring the reference of the output signal to the general ground. More particularly, the device may include shielding electrically connected to the excitation electrode, around the measurement electrode and around said first amplification stage. Such a configuration does not require the first amplification stage to be located in the immediate vicinity of the measurement electrode. The shielding of the measurement electrode may be extended by a shielded cable along which a conductor passes that connects the measurement electrode to the amplification means which are themselves provided with shielding forming the following portion of the shielded cable. The excitation electrode may overlap the measurement electrode.

The resistivity measuring device preferably comprises a pipe segment of insulating material and means for generating an electric current in the fluid flowing along the pipe, the device being characterized by the fact that it comprises two measurement electrodes spaced apart in the axial direction of the insulating segment to determine the electrical resistance of the fluid between the two electrodes, the measurement electrodes being applied to the outside of the wall of the segment to perform measurement by capacitive coupling, and by the fact that it further comprise measurement means for measuring the voltage between the measurement electrodes.

The measurement can thus be treated as a "4-point" resistance measurement.

Since this arrangement is not dependent on the contact impedance between the fluid and the upstream and downstream metal portions of the pipe, the surface state of the pipe has no effect on the measurement. Furthermore, no measurement electrode comes into contact with the fluid. There is thus no risk of corrosion. This characteristic makes the device of the invention particularly suitable for continuous, long term measurements. It is thus possible to fit a production tube with measurement segments of the invention at the levels of the fluid inlets, and thus monitor the actual production of each production zone in a hydrocarbon well. The device is also suitable for performing continuous measurements on the surface, in particular at a well head.

In a particular embodiment, the measurement electrodes are annular electrodes placed around the insulating pipe segment. Also, a guard electrode may surround each of the measurement electrodes.

More particularly, the measurement means for measuring the voltage between the measurement electrodes may be arranged to maintain the voltages of the guard electrodes at the same values as the voltages of the corresponding measurement electrodes.

The measurement means for measuring the voltage between the measurement electrodes may also be arranged so that the current flowing between the measurement electrodes is small enough to avoid affecting the measured voltage. Thus, the potential difference between the two electrodes is equal to the potential difference between the points in the fluid facing the electrodes.

In this case, the measurement means for measuring the voltage between the measurement electrodes may comprise respective follower amplifiers associated with each of the measurement electrodes, each amplifier having one of its inputs connected to a measurement electrode and its other input connected to the corresponding guard electrode and having its output connected to the guard electrode, the device further comprising means for determining the potential difference between the outputs of the two follower amplifiers. Such a follower amplifier possesses high input impedance which avoids the potential drop due to current passing through the insulation by the capacitive effect. Its output voltage is equal to the input voltage, but current is available at its output. More particularly, each follower amplifier may be connected to the corresponding measurement electrode by the core of a coaxial cable, and to the corresponding guard electrode by the shield of the cable.

In a particular embodiment, the means for generating an electric current in the fluid flowing in the pipe comprise a toroidal emitter coil surrounding the tubing and a return electrical conductor interconnecting metal portions of the pipe situated respectively upstream and downstream from the insulating segment. Such a coil has the advantage of not coming into contact with the fluid, and thus of being unaffected by corrosion problems. The emitter coil, connected to an AC voltage generator, generates an electric field in the fluid and thus behaves like a primary winding of a transformer whose secondary winding is constituted by the fluid and the return conductor. This electric field generates the above-specified current, which depends on the resistance of the fluid.

It is also preferred that the device of the invention comprises a toroidal receiver coil surrounding the tubing to form a current measuring system. Each receiver coil is connected to an electronic circuit having low input impedance. The output from the electronic circuit delivers a signal that is proportional to the current flowing in the fluid. In this case, the device may comprise means for determining the ratio between the output from the voltage-measurement means for measuring the voltage between said measurement electrodes and the output from the current-measuring system. This ratio is proportional to the resistance of the fluid, ignoring contact impedance.

The invention therefore provides a device for determining the volume fraction (or "holdup") of the conductive fluid in a multiphase fluid having a continuous conductive phase comprising a device of the type described above to measure the mean resistivity of the multiphase fluid, and means for deducing the volume fraction from the resistivity.

Determining the volume fraction requires not only knowledge of the mean resistivity, but also knowledge of the resistivity of the conductive phase and of the flow conditions. The resistivity of the conductive phase can be determined by other means, and it is possible to make various assumptions about the flow conditions or again, they can be measured directly.

In a particular embodiment of the invention, a Venturi total volumetric flow rate measurement is provided with a holdup measurement approximately 1–10 pipe diameters downstream of the Venturi. The invention makes use of a flow instability downstream of the Venturi throat. When the oil and water flow accelerates into the throat of the Venturi, the streamlines converge from their upstream value and the pressure drops as the hydrostatic head is converted into kinetic energy. Conversely, as the flow enters the diffuser section the pressure recovers as the flow decelerates. This adverse pressure gradient can lead to separation of the flow within the boundary layer at some position downstream of the throat of the Venturi. That position depends on the geometry of the Venturi, the individual oil and water flow rates, the deviation angle of the pipe to the horizontal, and the densities of the two fluids. The main flow expands beyond the Venturi as a jet of approximately uniform velocity bounded by a free shear layer, and such shear layers are prone to Kelvin-Helmholtz type instabilities that grow and are convected downstream. In the diffuser of the Venturi, an instability such as this grows and perturbs the interface between the two fluids. The amplitude of the instability depends on the geometry of the Venturi, the deviation of the pipe, the densities of the fluids, and the flow rates. An instability of sufficient strength causes the interface to roll up and break with a resulting mixing of the two layers completely across the pipe.

According to the invention, a method of determining the flow rate of a first fluid phase in a pipe containing at least two fluid phases is provided. The fluid phases flow through an upstream pipe, a constriction, which is preferably a Venturi, and a downstream pipe. The differential pressure of the fluid phases is measured such that it can be related to the total flow rate of the fluid phases through the section of pipe. The differential pressure is preferably measured between the upstream pipe and the throat of the Venturi. The volume fraction of the first fluid phase (preferably water) is determined by making a measurement at a location downstream of the constriction where a substantial amount of mixing of the at least two fluid phases is present, which results from the fluid passing through the Venturi. The flow rate of the first fluid (preferably water) is determined by assuming its velocity is substantially the same as that of the other fluid phases.

The present invention can provide a flow meter suitable for downhole placement that is extremely reliable and capable of operating for years at downhole temperatures and pressures. It can be capable of operating in both stratified (near-horizontal) and dispersed flow regimes over a wide range of total flow rate and cut. The flow meter may not require that the wellbore be oriented azimuthally in any particular way during installation. The invention also provides a flow meter that avoids the use of relatively strong radioactive sources. It can be capable of detecting small changes in water cut and flow rate and providing a measurement of a phase transition pressure. The invention can also be used to alleviate the problems associated with the use of conventional mixers, including the possible problems associated with measuring the pressure differential upstream and downstream of a conventional mixer.

BRIEF DESCRIPTION OF THE DRAWINGS

FIG. 1 is a perspective view of a section of pipe including a Venturi used to measure velocity and to mix oil and water according to a preferred embodiment of the invention;

FIG. 2 is a detailed cross sectional view of a Venturi used to measure velocity and to mix oil and water according to a preferred embodiment of the invention;

FIG. 3 is a perspective view of a section of pipe including a Venturi and other equipment used to measure velocity and to mix oil and water according to a preferred embodiment of the invention;

DETAILED DESCRIPTION OF THE INVENTION

Figure 4:
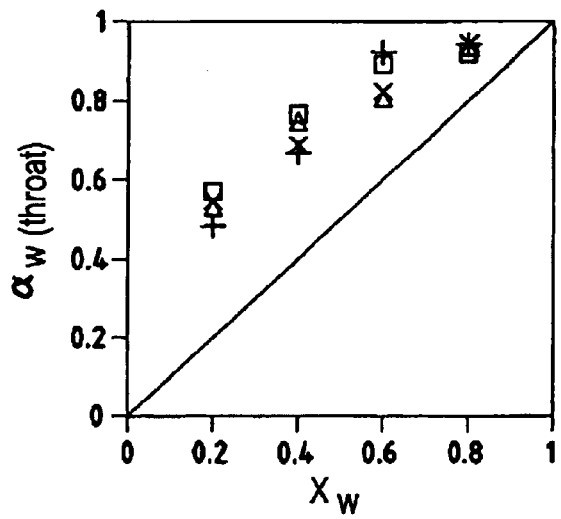
FIG. 4 is a graph illustrating the relationship between water holdup compared to the water cut as experimentally measured at a Venturi throat section.

FIG. 1 is a perspective view of a section of pipe 100 including a Venturi 110 used to measure velocity and to mix oil and water according to a preferred embodiment of the invention. The direction of flow is shown by arrow 102. Pipe section 112 is upstream of the Venturi 110. Venturi 110 comprises a tapered inlet section 114, a Venturi throat 116, and a Venturi diffuser 118. Pipe section 120 is downstream of the Venturi 110, and has diameter 124. According to the invention, it has been found that significant mixing of oil and water takes place downstream of Venturi 110 and therefore it is a good place to make a holdup measurement. In FIG. 1, downstream location 122 is shown to be a suitable location for measuring the holdup.

FIG. 2 is a detailed cross sectional view of a Venturi used to measure velocity and to mix oil and water according to a preferred embodiment of the invention. The direction of flow is shown by arrow 102. Inlet 114 is smoothly tapered from the diameter of the upstream section 112 to the diameter of the Venturi throat 116. As shown in FIG. 2, the Venturi throat 116 has a diameter narrower than upstream section 112. The walls of the Venturi throat 116 are preferably approximately parallel along the direction of flow 102. The Venturi diffuser 118 is gradually tapered from the diameter of the Venturi throat 116 to approximately the diameter 124 of the downstream section 120. Upstream section 112, inlet 114, throat 116, diffuser 118, and downstream section 120 all have approximately circular cross-sections, and the diameter of the throat 116 is preferably about half that of the upstream pipe section (i.e. $0.316 < \beta < 0.7751$). For, example if the upstream pipe section diameter is 15 cm, then the throat is preferably about 7.5 cm. Preferably, Venturi 110 is designed to meet the ISO standard and is designed so as to allow for relatively accurate measurements of differential pressure, while impeding the flow as little as possible. However, it is contemplated that other Venturi dimensions and geometries could also facilitate an accurate differential pressure measurement and provide sufficient mixing for an accurate holdup measurement, according to the invention. The location with respect to the Venturi where the holdup measurements were taken is shown at downstream location 120. As will be described in greater detail below, measuring the holdup at locations downstream as shown advantageously allows for much more accurate determinations of flow rates. As shown in FIG. 2, a port 134 is provided to measure the pressure at a location within Venturi throat 116. Another port, not shown in FIG. 2, is provided upstream which in combination with port 134 allows for measurement of pressure differential.

FIG. 3 is a perspective view of a section of pipe including a Venturi and other equipment used to measure velocity and to mix oil and water according to a preferred embodiment of the invention.

In a preferred embodiment shown in FIG. 3, the invention combines a Venturi 110 with a combined resistivity and dielectric measurement-based flow meter that is described in more detail below. A differential pressure sensor 130 measures the pressure drop between the inlet 112 (at port 132) and the Venturi throat 116 (at port 134). (Note that although the pressure sensor 130 is shown to measure the differential pressure between the locations of ports 132 and 134, other locations could be chosen. For example, although unconventional, one of the measurements could be taken downstream of the Venturi.) A flow instability develops as the flow exits from the Venturi diffuser 118. The holdup meter is preferably placed at a particular location which is a distance 1–10 times the downstream pipe diameter 124. However, a substantial improvement in the accuracy of determining the relative flow rates of water and oil can be obtained under some circumstances by measuring the holdup at any location from just downstream of the Venturi to about 20 pipe diameters. For example, it may be sufficiently accurate to measure the holdup at locations where the stratification has been significantly perturbed.

It is presently believed that measuring the holdup in a region approximately 1–5 diameters from the Venturi can provide even greater accuracy over a wider range of flow rates. In certain conditions, it is believed that measuring the holdup at approximately 5 diameters from end of the diffuser will provide the greatest accuracy in relative flow rate measurement.

In general, the distance from the Venturi at which a suitable amount of mixing occurs will depend on many factors. First the amount of mixing needed to substantially improve flow rate determination depends on the method of holdup measurement. Second, the distance from the Venturi at which suitable mixing occurs depends on the particular geometry and anticipated flow rates of the fluids in the Venturi. Furthermore, the density and viscosity of the fluids, and the deviation can influence the amount and location of mixing caused by the Venturi.

FIG. 4 is a graph illustrating the relationship between water holdup compared to the water cut as experimentally measured at a Venturi throat when flowing various mixtures of oil and water. The vertical axis is the water holdup, or the volume fraction of water. The horizontal axis is water cut, or the ratio of water flow rate to the total volumetric flow rate. The measurements were taken at different total volumetric flow rates ranging from 40 cubic meters per hour to 100 cubic meters per hour. As can be seen in FIG. 4, the water holdup varies significantly from the water cut at all measured flow rates.

Figure 5:
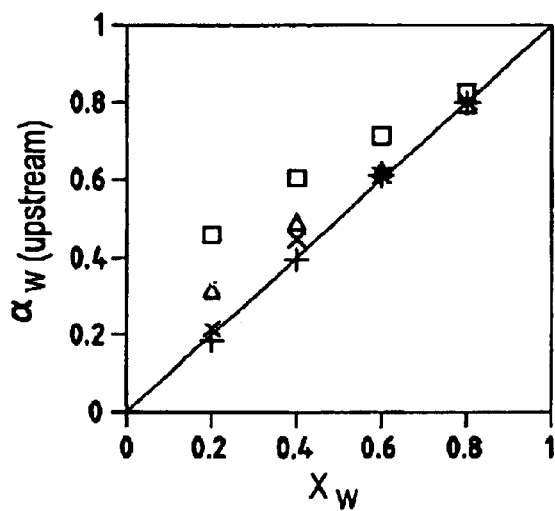
FIG. 5 is a graph illustrating the relationship between water holdup compared to the water cut as experimentally measured at a location upstream from a Venturi.

Similarly, FIG. 5 is a graph illustrating the relationship between water holdup compared to the water cut, but the holdup measurements were made at a location upstream from a Venturi. As in FIG. 4, the holdup measurements do not accurately reflect the water cut values for most of the flow rates measured.

Figure 6:
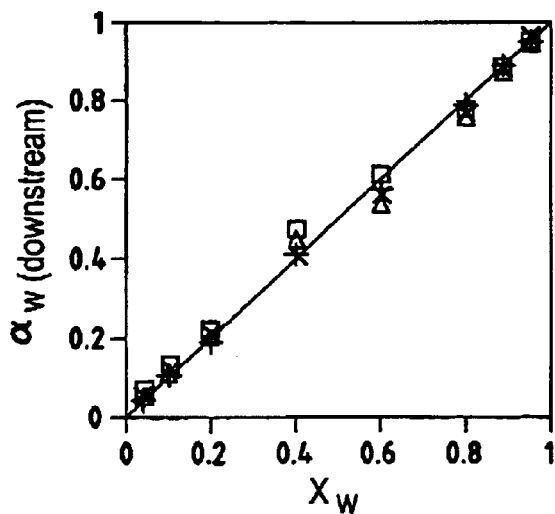
FIG. 6 is a graph illustrating the relationship between water holdup compared to the water cut as experimentally measured at a location downstream from a Venturi, according to a preferred embodiment of the invention.

FIG. 6 is a graph illustrating the relationship between water holdup compared to the water cut as measured at a location downstream from a Venturi, according to a preferred embodiment of the invention. Specifically, in FIG. 6, the water holdup was measured at a location approximately 3 pipe diameters downstream from the downstream end of the Venturi diffuser. As can be seen in FIG. 6, in stark contrast from the data in FIGS. 4 and 5, the measured holdup accurately reflects the water cut at all the measured flow rates.

A significant instability exists downstream of the Venturi regardless of the flow regime at the inlet of the Venturi as long as the total flow rate exceeds a minimum value. For example, for a 15 cm diameter upstream section of pipe with a Venturi throat diameter of about 7.5 cm (i.e. $0.316 < \beta < 0.7751$), approximately 20 cubic meters per hour. Because of this instability and the mixing that it produces, oil and water are well-mixed approximately 1–10 pipe diameters downstream of the Venturi exit, although as mentioned above, other measuring the holdup at other locations may be suitable in certain situations.

Due to the well-mixed condition, the oil and water are nearly homogeneously distributed throughout the pipe and the slip velocity between oil and water is very small. In such a condition, the water holdup is equal to the water cut Xw, or ratio of the water volumetric flow rate to the total flow rate. Conversely, the oil holdup is equal to the oil cut, or ratio of the oil volumetric flow rate to the total flow rate. This is important because the oil and water flow rates can then be obtained directly from the product of the respective holdup and total flow rate from the Venturi:

$$Q_o = X_o Q = \alpha_o Q \qquad \text{Equation 4}$$

$$Q_w = X_w Q = \alpha_w Q \qquad \text{Equation 5}$$

Advantageously, no slip model is required. Even if the water holdup is not exactly the same as the water cut, differences of a few percent can be incorporated as empirical corrections to the equations given above. Preferably, the holdup measurement is made at a location downstream of the Venturi where the difference between the water holdup and the water cut is be negligible for the particular measurement requirements the application at hand.

In a well-mixed flow, there is little slip and the water holdup is essentially equal to the water cut. It is important to note that such conditions do not exist at other locations in the pipe, such as upstream of the Venturi or in the Venturi throat. The water holdup at the Venturi throat is compared to the water cut in FIG. 4. Clearly, the holdup is not equal to the cut, indicating that the mixture is not homogeneous. In FIG. 5, the water holdup upstream is compared to the water cut. Again, the holdup is not equal to the cut. Finally, in FIG. 6, the water holdup downstream at a spacing of 3 pipe diameters from the Venturi exit is plotted against water cut. In this case the holdup is very nearly equal to the cut.

Although the present invention has thus far been principally described in connection with measuring fluid flow rates in mixtures of oil and water, the present invention is also applicable to facilitate the determination of fluid flow rates in other mixtures. In general, a Venturi could also be used to determine velocity and as a mixer for mixtures of any fluids, including gas phases. For example, two liquids, one liquid and one gas, or two liquids and one gas. The geometry of the Venturi can be designed so as to facilitate a suitable amount of mixing at the flow rates of interest, and the measurement of the holdup should be taken at a downstream location where a sufficient amount of mixing takes place to enable an accurate determination of flow rate from the measured volume fraction.

As mentioned, the present invention is applicable to mixtures of three or more phases, where a suitable Venturi can be used to both measure velocity and mix the various phases. So long as the velocity of the phases and the geometry of the Venturi is sufficient to mix the various phases, the amount of slip can be reduced to a relatively small level and accurate flow rates can be determined. When determining flow rates in mixtures of three or more phases, one or more additional measurements can be taken to determine the particular holdup of interest.

Figure 7:
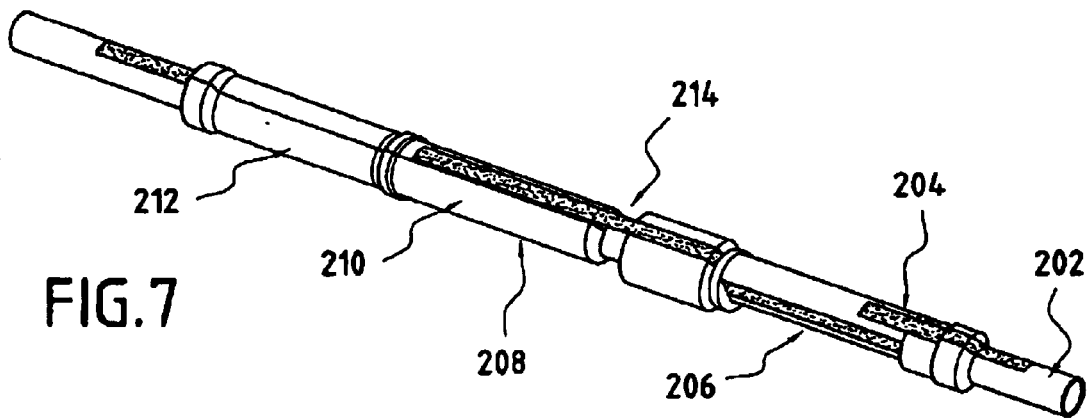
FIG. 7 shows an installation according to one embodiment of the invention.

FIG. 7 shows one embodiment of a system 200 according to the invention. The system comprises a base tube 202 through which the fluids produced by the well flow. The first part of the system is a Venturi device 204 of the type described above which is provided with differential pressure measuring sensors 206 which are located outside the tubing 202. Downstream of the Venturi device 204 is located a resistivity and dielectric flow measurement device 208 which is described in more detail below mounted on a mandrel 210. Measurement and telemetry electronics 212 are located on the tubing 202 adjacent the flow measurement device 208 and are connected to the flow measurement device 208 and differential pressure measuring sensors by a leak proof cable 214.

The dielectric (capacitance) measurement part of the flow meter 208 is shown in FIGS. 8–12. At this point, the pipe 202 comprises a metal tube 221 designed to withstand pressure and internally lined with an insulating material 222. A multi-phase fluid (hydrocarbons and water) represented by arrow F, flows along the pipe 221.

Figure 12:
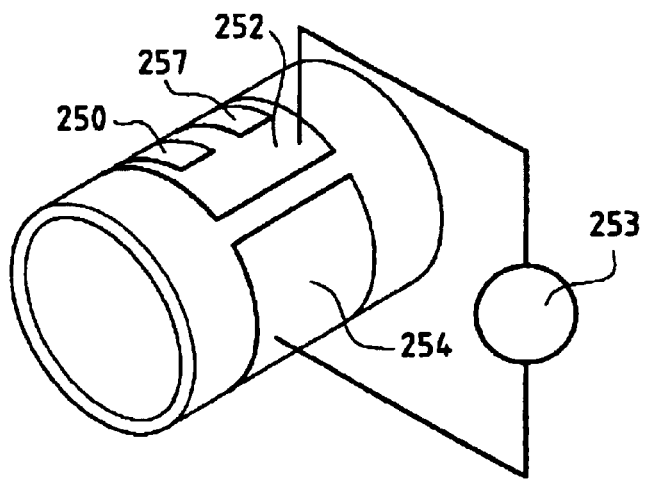
FIG. 12 shows how devices of the type shown in FIG. 8 are used to perform flow-rate measurements.

Two active electrodes 223 and 224 are disposed facing each other on the inside surface of the pipe, thereby substantially forming two semi-cylindrical half-sleeves (as also shown in FIG. 12). The electrode 223 is uninterrupted, whereas the "excitation" electrode 224 is cut to allow space in contact with the tube for a measurement electrode 225 from which the excitation electrode is electrically insulated. The electrode 224 overlaps most of the measurement electrode 225 and is merely provided with an orifice 226 for passing a conductor 227 connected to the measurement electrode 225.

A voltage generator 228 whose output terminals are connected to the electrodes 223 and 224 delivers an AC voltage across said electrodes.

The conductor 227 and a conductor 229 connected to the electrode 224 are connected to the input of an amplifier 230 fed with DC from a power supply 231. The amplifier maintains the electrodes 224 and 225 at the same potential. The output 232 of the amplifier 230 is connected to an input of an instrumentation amplifier 233 whose other input receives a conductor 234 connected to the electrode 224.

The two amplifiers 230 and 233 thus form the first two stages of an amplification system for amplifying the current i delivered by the measurement electrode 225. The first stage has a floating ground referenced relative to the potential of the electrode 224, whereas the second stage is referenced to the general ground 235. The output voltage U of amplifier 233, relative to the general ground 235, is proportional to the current i.

It can be observed that shielding 236 connected to the electrode 224 covers and isolates the entire first amplification stage 230, thereby contributing to further reducing the crosstalk between the device and the excitation, which crosstalk is already limited considerably by the fact that all of the conductors situated in the vicinity of the measurement electrode 225 are at the same potential as the measurement electrode.

The output 237 of the amplification system is connected to the input of a processing unit 238. The processing unit 238 shapes the output signal, digitizes it, and deduces the capacitance of the capacitor made up of the electrode 223 and of the measurement electrode 225 from the AC voltage delivered by the generator and from the resulting current i. Knowing the geometry of the capacitor, the unit 238 can then determine the dielectric constant of the two-phase fluid, and calculate the water volume fraction by the above-mentioned relationship:

$$e_m = e_o \frac{1}{(1 - H_w)^3}$$

Figure 9:
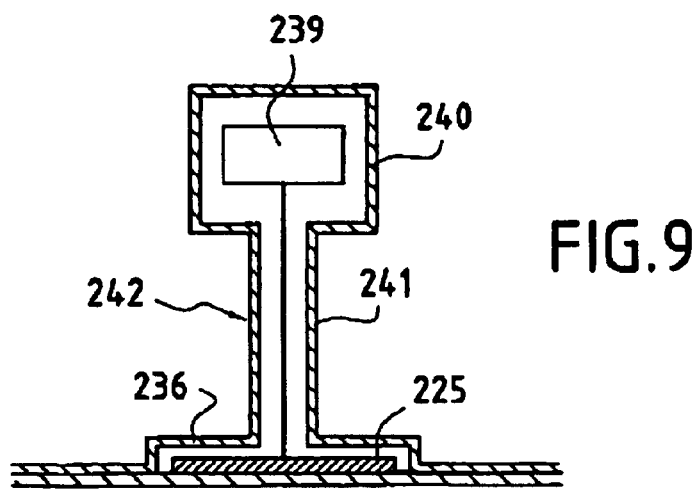
FIG. 9 shows a variant of the device shown in FIG. 8.

In another embodiment, shown in FIG. 9, the amplification and measurement electronic circuitry is no longer situated at the measurement electrode 225, but rather it is situated a certain distance away. In this case, the electronic circuitry 239 is disposed in shielding 240 connected to the shielding 236 of the measurement electrode 225 by a braid 241 of a coaxial cable 242. The conductor 227 is then brought to the electronic circuitry 239 in the cable 242.

In the case shown in FIG. 9, the excitation electrode 224 is connected to the general ground of the power supply means. If a floating ground were provided for the current-measuring means, the equivalent of the conductor 234 shown in FIG. 8 would also be brought along the cable 242.

Figure 10:
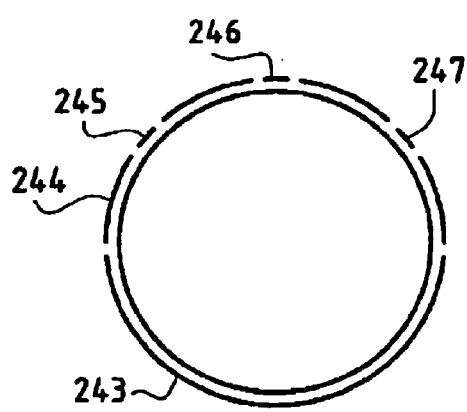
FIG. 10 shows how devices of the type shown in FIG. 8 are used to obtain cross-sections, e.g. of volume fraction distribution.
Figure 11:
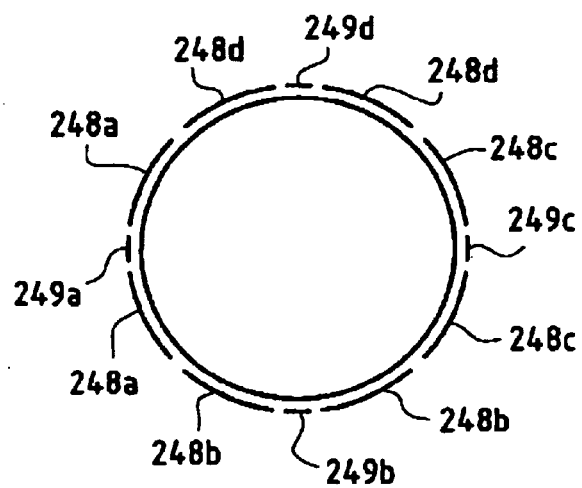
FIG. 11 shows another embodiment of the arrangement shown in FIG. 10.

When the fluid is not homogeneous, which occurs, for example, in a deviated well having a low flow rate, the configurations shown in FIGS. 10 and 11 may be chosen.

Figure 8:
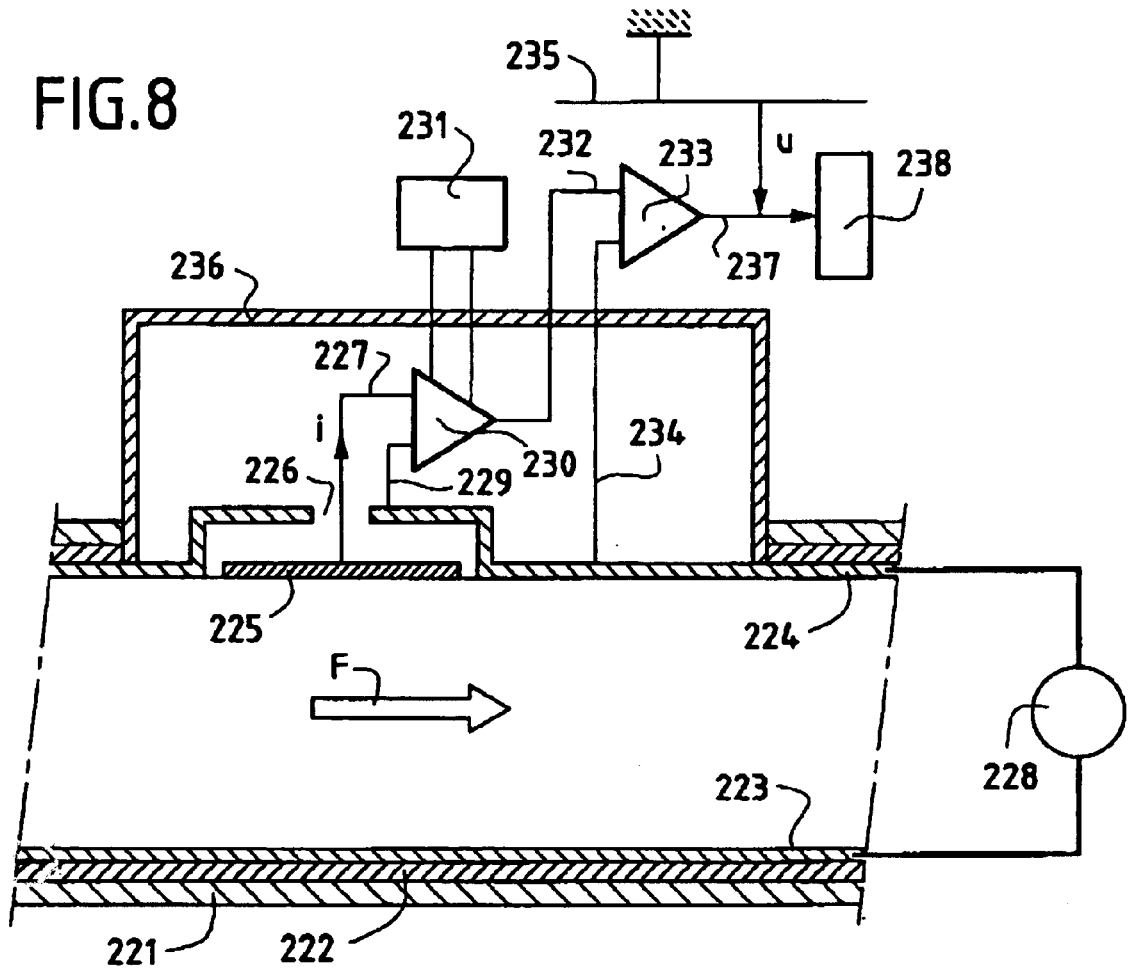
FIG. 8 is an electric circuit diagram of a device of the invention for measuring the dielectric constant of a two-phase fluid.

The embodiment shown in FIG. 10 is similar to that shown in FIG. 8. A semi-cylindrical electrode 243 corresponds to the electrode 223, and an excitation electrode 244 corresponds to the excitation electrode 224. However, in this embodiment, the excitation electrode 244 is provided with three cutouts into which three measurement electrodes 245, 246, and 247 are inserted. The three measurement electrodes are disposed in the same cross-section of the pipe, and they are uniformly distributed over one half of the circumference of the cross-section. Naturally, a larger number of measurement electrodes may be provided.

In the embodiment shown in FIG. 11, four independent sensors are provided, each of which comprises a respective excitation electrode 248a–248d provided with a cutout in which a respective measurement electrode 249a–249d is included.

The outputs of all of the sensors are connected to the input of a processing unit (not shown) which provides a section of the distribution of the water volume fraction in the fluid across the pipe.

FIG. 12 shows a device similar to the FIG. 8 device, except that it comprises two measurement electrodes 250 and 251 disposed on the same generator line of a pipe, and included in respective cutouts in the same excitation electrode 252. As above, the signal generator 253 applies an AC voltage across the electrode 252 and an opposite electrode 254.

As indicated above, cross-correlation of the signals collected at the measurement electrodes 250 and 251 gives the speed at which the inhomogeneous structures are displaced between the measurement electrodes 250 and 251, and thus the mean speed of the flow along the pipe.

Naturally, the two embodiments shown in FIGS. 9 and 10 may be combined to deliver as many flow characteristics as possible.

Figure 13:
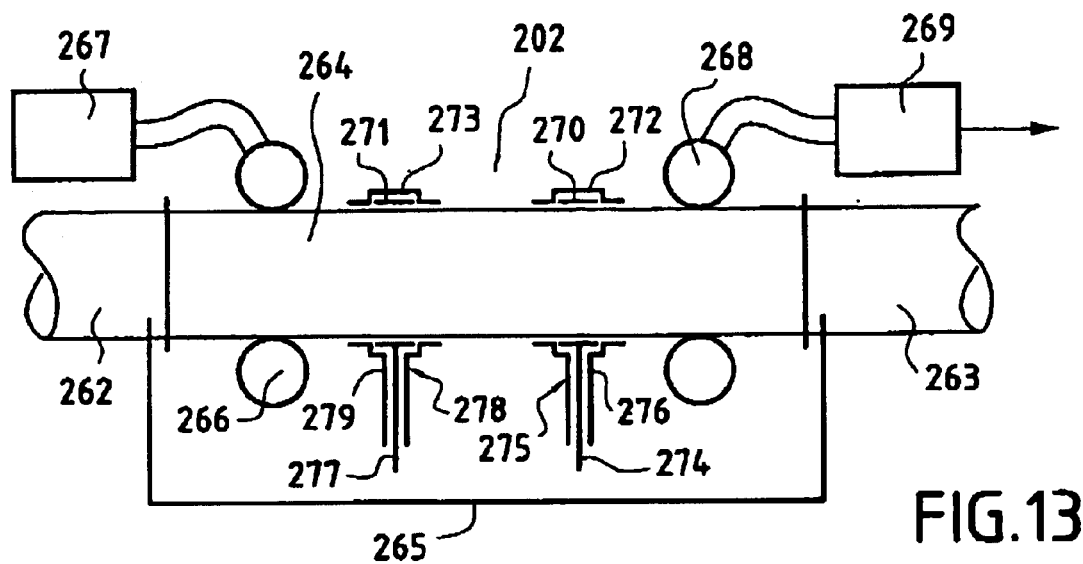
FIG. 13 is an overall view of a device for measuring resistivity of flowing fluids according to an embodiment of the invention.
Figure 14:
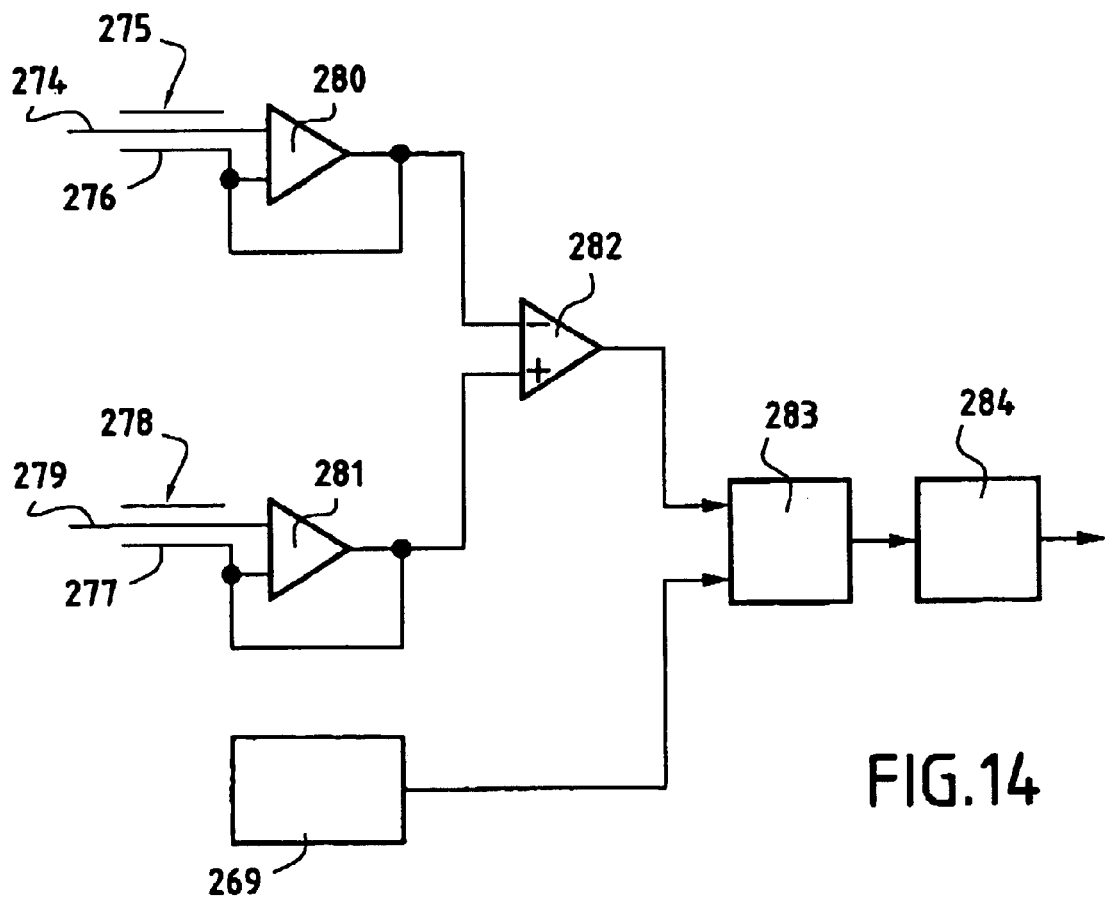
FIG. 14 is an electrical circuit diagram for use with the device of FIG. 14.

The resistivity measuring part of the flow meter 208 is shown in FIGS. 13 and 14 and is applicable to flows in which the aqueous phase is continuous, such that the mixture is electrically conductive.

The pipe 202 is constituted by an upstream segment 262 and a downstream segment 263 that are both made of metal, together with a measurement segment 264 of a material that is electrically non-conductive. An electrical conductor 265 interconnects the conductive segments 262 and 263 so as to form an electric circuit that is completed by the fluid flowing along the pipe.

A toroidal emitter coil 266 is disposed around the pipe 202 inside the current loop defined by the conductor 265, e.g. in the upstream portion of the measurement segment 264 as shown herein. The coil 266 is powered by a generator 267 for generating an alternating voltage. It thus generates an alternating electric field in the fluid which in turn generates an alternating current in the fluid and in the conductor 265.

A toroidal receiver coil 268 is disposed around the pipe 202, also within the current loop defined by the conductor 265, e.g. in the downstream portion of the measurement segment 264. The coil 268 is connected to a measurement circuit 269 having low input impedance. The current in the fluid induces a current in the coil 268 such that the output signal from the measurement circuit 2o 269 is proportional to the current in the fluid.

Two annular measurement electrodes 270 and 271 are disposed on the outside surface of the pipe segment 264. They are covered by two respective guard electrodes 272 and 273.

The output from the measurement electrode 270 takes place via the core conductor 274 of a coaxial cable 275 which passes through a hole in the guard electrode 272. The shield 276 of the coaxial cable 275 is connected to said electrode 272.

Similarly, the output from the measurement electrode 271 is taken via the core conductor 277 of a coaxial cable 278 which passes through a hole in the guard electrode 273. The shield 279 of the coaxial cable 278 is connected to the electrode 273.

The core 274 of the cable 275 is connected at one input to a follower amplifier 280 whose other input and whose output are connected to the shield 276. Similarly, the core 277 of the cable 278 is connected to one input of a follower amplifier 281 whose other input and whose output are connected to the shield 279.

Thus, the electrodes in each of the pairs 270, 272 and 271, 273 are maintained at the same potential as each other and a very small current flows along the conductors 274 and 277, such that each of the electrodes 270 and 271 is at the same potential as the fluid facing it on the other side of the wall of the pipe segment 264.

The outputs from the amplifiers 280 and 281 are applied respectively to the inverting and to the non-inverting inputs (− and +) of a differential amplifier 282. The output from the amplifier 282 is thus representative of the potential difference in the fluid between the planes of the electrodes 270 and 271.

The output from the measurement circuit 269, i.e. the current in the fluid, and the output from the amplifier 282, i.e. the above-mentioned potential difference, are input to a circuit 283 which determines the ratio of these two quantities. The output from the circuit 283 is thus representative of the resistance of the fluid between the planes of the electrodes 270 and 271.

Given knowledge of the cross-section of the segment 264 and the axial distance between the electrodes 270 and 271, it is possible in a circuit 284 to deduce the mean resistivity of the fluid.

From the above, and by using appropriate computation means, it is thus possible to deduce the water volume fraction or "holdup" of the two-phase mixture, assuming that the resistivity of the water is known, and making assumptions about the flow conditions of the fluid.

For a flow that is well stratified, the water and the hydrocarbons flow along the pipe in the form of two separate layers. Under such circumstances:

$$R = \rho_W \frac{L}{S_W}$$

where $\rho_w$ is the resistivity of the water, $S_w$ is the cross-section of the water layer, and L is the distance between the measurement electrodes.

The volume fraction or "holdup" of the water $H_w$ is then:

$$H_W = \frac{S_W}{S} = \frac{\rho_W L}{RS}$$

where S is the total cross-section of the pipe.

Conversely, for a flow that is entirely uniform, the resistivity of the mixture $\rho_{mix}$ is given by:

$$R = \rho_{mix} \frac{L}{S}$$

The water volume fraction $H_w$ is then deduced from the "Ramu Rao" formula:

$$\rho_{mix} = \rho_W \frac{3-H_W}{2H_W} \quad 3-H_W$$

What is claimed is:

1. A flow meter for multiphase flows, comprising a holdup measuring device having a Venturi located upstream thereof and separated therefrom by a distance that results in flow through the holdup measuring device being at least partially homogenized by the effect of the Venturi on the fluids flowing therethrough, wherein the holdup measuring device includes a resistive device measuring the resistivity of the flowing fluids.

2. A flow meter as claimed in claim 1, wherein the holdup measuring device measures volume fractions in the range of 0–100% water.

3. A flow meter as claimed in claim 2, wherein the holdup measuring device comprises a combination of capacitive and resistive measurements on the flowing fluids.

4. A flow meter as claimed in claim 1, wherein the resistivity measuring device comprises:
   (i) a pipe segment of insulating material;
   (ii) an electric current generator which generates a current in the fluid flowing along the pipe;
   (iii) two measurement electrodes spaced apart in the axial direction of the insulating segment and applied to an outside of the wall of the pipe to perform measurement by capacitive coupling so as to measure the electrical resistance therebetween; and
   (iv) a measurement system for measuring the voltage between the measurement electrodes.

5. A flow meter as claimed in claim 4, wherein the measurement electrodes are annular electrodes placed around the insulating pipe segment.

6. A flow meter as claimed in claim 5, wherein a guard electrode surrounds each of the measurement electrodes.

7. A flow meter as claimed in claim 6, wherein the measurement system maintains the voltages of the guard electrodes at the same values as the voltages of the corresponding measurement electrodes.

8. A flow meter as claimed in claim 4, wherein the measurement system is configured such that the current flowing between the measurement electrodes is small enough to avoid affecting the measured voltage so that the potential difference between the two electrodes is equal to the potential difference between the points in the fluid facing the electrodes.

9. A flow meter as claimed in claim 8, wherein the measurement system comprises respective follower amplifiers associated with each of the measurement electrodes, each amplifier having an input connected to a measurement electrode and another input connected to a corresponding guard electrode and having an output connected to the guard electrode, the system further comprising means for determining the potential difference between the outputs of the two follower amplifiers.

10. A flow meter as claimed in claim 9, wherein each follower amplifier is connected to a corresponding measurement electrode by a core of a coaxial cable, and to a corresponding guard electrode by a shield of the coaxial cable.

11. A flow meter as claimed in claim 4, wherein the electric current generator comprises a toroidal emitter coil surrounding the tubing and a return electrical conductor interconnecting metal portions of the pipe situated respectively upstream and downstream from the insulating segment.

12. A flow meter as claimed in claim 4, further comprising a toroidal receiver coil surrounding the tubing to form a current measuring system.

13. A flow meter as claimed in claim 12, wherein each receiver coil is connected to an electronic circuit having low input impedance and the output from the electronic circuit delivers a signal that is proportional to the current flowing in the fluid.

14. A flow meter as claimed in claim 13, wherein the measurement system determines the ratio between the output from a voltage-measurement system that measures the voltage between the measurement electrodes and the output from a current-measuring system, the ratio being proportional to the resistance of the fluid.

15. A flow meter as claimed in claim 1, wherein the holdup measuring device is located approximately 1–10 pipe diameters downstream of the Venturi.

16. A flow meter for multiphase flows, comprising a holdup measuring device having a Venturi located upstream thereof and separated therefrom by a distance that results in flow through the holdup measuring device being at least partially homogenized by the effect of the Venturi on the fluids flowing therethrough, wherein the holdup measuring device includes a capacitive device including a capacitance sensor which measures the dielectric constant of the flowing fluids, wherein a capacitance sensor comprises at least one excitation electrode provided with at least one cutout in which at least one measurement electrode is disposed, the electrodes being applied against a pipe through which the fluids flow.

17. A flow meter as claimed in claim 16, further comprising a system for maintaining the electrodes at the same potential and for measuring the current output by the measurement electrode, and a processing system for determining the dielectric constant of the fluids from the measured current.

18. A flow meter as claimed in claim 17, wherein the excitation electrode constitutes a floating ground for the current measuring system.

19. A flow meter as claimed in claim 18, wherein the current measuring system comprises a first amplification stage referenced relative to the potential of the excitation electrode, and a second amplification stage arranged to bring the reference of the output signal to the general ground.

20. A flow meter as claimed in claim 19, further comprising shielding, electrically connected to the excitation electrode, around the measurement electrode and around the first amplification stage.

21. A flow meter as claimed in claim 20, wherein the shielding is extended by a shielded cable along which a conductor passes that connects the measurement electrode to the amplification stage which also is provided with shielding.

22. A flow meter as claimed in claim 21, wherein the excitation electrode overlaps the measurement electrode.

23. A flow meter as claimed in claim 16, wherein all of the conductors liable to give rise to interference that are situated in the vicinity of the sensor are maintained at the potential of the excitation electrode.

24. A flow meter as claimed in claim 16, wherein the excitation electrode is connected to the general ground of a power supply.

25. A flow meter for multiphase flows, comprising a holdup measuring device having a Venturi located upstream thereof and separated therefrom by a distance that results in flow through the holdup measuring device being at least partially homogenized by the effect of the Venturi on the fluids flowing therethrough, the holdup measuring device comprising a capacitive sensor for determining the flow characteristics of a multiphase fluid in a pipe, comprising at least one excitation electrode which part of the surface defines a cutout to allow free space in which at least one measurement electrode is disposed, said electrodes being arranged to be applied against said pipe.

26. A flow meter for multiphase flows, comprising a holdup measuring device having a Venturi located upstream thereof and separated therefrom by a distance that results in flow through the holdup measuring device being at least partially homogenized by the effect of the Venturi on the fluids flowing therethrough, the holdup measuring device comprising a device for capacitively measuring the dielectric constant of a two-phase fluid flowing along a pipe, comprising:

at least one capacitive sensor comprising at least one excitation electrode which part of the surface defines a cutout to allow free space in which at least one measurement electrode is disposed, said electrodes being arranged to be applied against said pipe;

power supply means connected to the excitation electrode of said capacitive sensor in order to apply an AC voltage to said excitation electrode;

amplification means connected to both the excitation electrode and the measurement electrode in order to maintain said electrodes at the same potential and capacitively measure the current (i) output by said measurement electrode; and deducing means connected to said amplification means in order to deduce said dielectric constant from said current (i).

27. A device according to claim 26, in which said excitation electrode is connected to the general ground of said power supply means.

28. A device according to claim 26, in which an electrode is connected to the general ground of said power supply means, a floating ground being provided for said amplifying means for measuring the current.

29. A device according to claim 28, in which said amplifying means for measuring the current comprise a first amplification stage referenced relative to the potential of the excitation electrode, and a second amplification stage organized to bring the reference of the output signal to the general ground.

30. A device according to claim 29, including shielding electrically connected to the excitation electrode, around the measurement electrode and around said first amplification stage.

31. A device according to claim 26, in which said excitation electrode covers the measurement electrode.

32. A flow meter for multiphase flows, comprising a holdup measuring device having a Venturi located upstream thereof and separated therefrom by a distance that results in flow through the holdup measuring device being at least partially homogenized by the effect of the Venturi on the fluids flowing therethrough, the holdup measuring device comprising a device for capacitively measuring the volume fraction of a first fluid in a two-phase fluid flowing along a pipe, comprising:

at least one device for capacitively measuring the dielectric constant of said fluid, said device comprising:
at least one capacitive sensor comprising at least one excitation electrode which part of the surface defines a cutout to allow free space in which at least one measurement electrode is disposed, said electrodes being arranged to be applied against said pipe;

power supply means connected to the excitation electrode of said capacitive sensor in order to apply an AC voltage to said excitation electrode;

amplification means connected to both the excitation electrode and the measurement electrode in order to maintain said electrodes at the same potential and capacitively measure the current (i) output by said measurement electrode;

calculating means connected to said amplification means in order to deduce said dielectric constant from said current (i) and calculate said volume fraction from said dielectric constant.

33. A device according to claim 32, comprising a plurality of devices for capacitively measuring the dielectric constant of said fluid, said plurality of devices being distributed over the periphery of a cross-section of said pipe.

34. A flow meter for multiphase flows, comprising a holdup measuring device having a Venturi located upstream thereof and separated therefrom by a distance that results in flow through the holdup measuring device being at least partially homogenized by the effect of the Venturi on the fluids flowing therethrough, the holdup measuring device comprising a capacitive device for measuring the speed of a two-phase fluid flowing along a pipe, comprising:

at least two devices that are disposed in different cross-sections of said pipe, said devices comprising:
at least one capacitive sensor comprising at least one excitation electrode which part of the surface defines a cutout to allow free space in which at least one measurement electrode is disposed, said electrodes being arranged to be applied against said pipe;

power supply means connected to the excitation electrode of said capacitive sensor in order to apply an AC voltage to said excitation electrode;

amplification means connected to both the excitation electrode and the measurement electrode in order to maintain said electrodes at the same potential and capacitively measure the current (i) output by said measurement electrode; and deducing means connected to said amplification means in order to deduce said dielectric constant from said current (i); and correlating means connected to both of said two devices in order to establish a cross-correlation between the measurements delivered by said two devices and for deducing said speed therefrom.

35. A device according to claim 34, in which said at least two devices are disposed substantially along the same generator line of said pipe, and have a common excitation electrode.

36. A flow meter for multiphase flows, comprising a holdup measuring device having a Venturi located upstream thereof and separated therefrom by a distance that results in flow through the holdup measuring device being at least partially homogenized by the effect of the Venturi on the fluids flowing therethrough, the holdup measuring device comprising a device for capacitively measuring the flow rate of a fluid in a two-phase fluid flowing along a pipe, comprising at least one device for capacitively measuring the volume fraction of a said fluid, comprising:
at least one device for capacitively measuring the dielectric constant of said fluid, said device including at least one capacitive sensor comprising at least one excitation electrode which part of the surface defines a cutout to allow free space in which at least one measurement electrode is disposed, said electrodes being arranged to be applied against said pipe; power supply means connected to the excitation electrode of said capacitive sensor in order to apply an AC voltage to said excitation electrode; amplification means connected to both the excitation electrode and the measurement electrode in order to maintain said electrodes at the same potential and capacitively measure the current (i) output by said measurement electrode; and calculating means connected to said amplification means in order to deduce said dielectric constant from said current (i) and calculate said volume fraction from said dielectric constant;

at least one capacitive device for measuring the speed of a two-phase fluid flowing along a pipe, comprising:
at least two devices that are disposed in different cross-sections of said pipe, said two devices including at least one capacitive sensor comprising at least one excitation electrode which part of the surface defines a cutout to allow free space in which at least one measurement electrode is disposed, said electrodes being arranged to be applied against said pipe; power supply means connected to the excitation electrode of said capacitive sensor in order to apply an AC voltage to said excitation electrode; amplification means connected to both the excitation electrode and the measurement electrode in order to maintain said electrodes at the same potential and capacitively measure the current (i) output by said measurement electrode; deducing means connected to said amplification means in order to deduce said dielectric constant from said current (i);

and correlating means connected to said capacitive device for measuring the speed, in order to establish a cross-correlation between the measurements delivered by capacitive device and to deduce said speed and thus said flow rate therefrom.

* * * * *